United States Patent [19]

Mercurio

[11] Patent Number: 5,661,903
[45] Date of Patent: Sep. 2, 1997

[54] METHOD FOR SPLICING SUSPENDED WIRES

[76] Inventor: Mark Antonio Mercurio, 92 Martins La., Yardville, N.J. 08620

[21] Appl. No.: 412,732

[22] Filed: Mar. 29, 1995

Related U.S. Application Data

[62] Division of Ser. No. 230,293, Apr. 20, 1994, Pat. No. 5,507,471.

[51] Int. Cl.⁶ .................................................. H01R 43/00
[52] U.S. Cl. ........................ 29/868; 29/402.01; 29/402.09
[58] Field of Search ...................... 29/868, 869, 402.09, 29/402.01; 254/213, 214, 215, 226, 241, 298, 295, 134.3 R

[56] References Cited

U.S. PATENT DOCUMENTS

| | | |
|---|---|---|
| 813,574 | 2/1906 | McNames. |
| 966,828 | 8/1910 | Habben. |
| 1,171,784 | 2/1916 | Green. |
| 1,520,628 | 12/1924 | Anderson. |
| 1,738,924 | 12/1929 | Przybyszewski. |
| 2,354,422 | 7/1944 | Roby. |
| 3,687,418 | 8/1972 | Halvorsen. |
| 3,960,362 | 6/1976 | Griffiths et al.. |
| 4,109,799 | 8/1978 | Munn. |
| 4,531,714 | 7/1985 | Bahr. |
| 4,622,721 | 11/1986 | Smetz et al.. |
| 4,623,124 | 11/1986 | Lewis. |
| 4,850,570 | 7/1989 | Cabanos et al.. |
| 4,884,784 | 12/1989 | Nix et al.. |
| 5,018,708 | 5/1991 | Shaffer. |
| 5,204,544 | 4/1993 | Kroeger. |

OTHER PUBLICATIONS

Lug All® Winch Hoist Operating Instructions.

*Primary Examiner*—S. Thomas Hughes
*Attorney, Agent, or Firm*—Watov & Kipnes, P.C.

[57] ABSTRACT

A method for splicing broken ends of wires suspended from a given height by attaching belts extending from opposite ends of a device to points near the broken ends, operating the device in one direction to draw the broken ends together and raise the device near to said given level, splicing the broken ends of said wires, operating the device in the reverse direction, and detaching the belts from said wires.

9 Claims, 4 Drawing Sheets

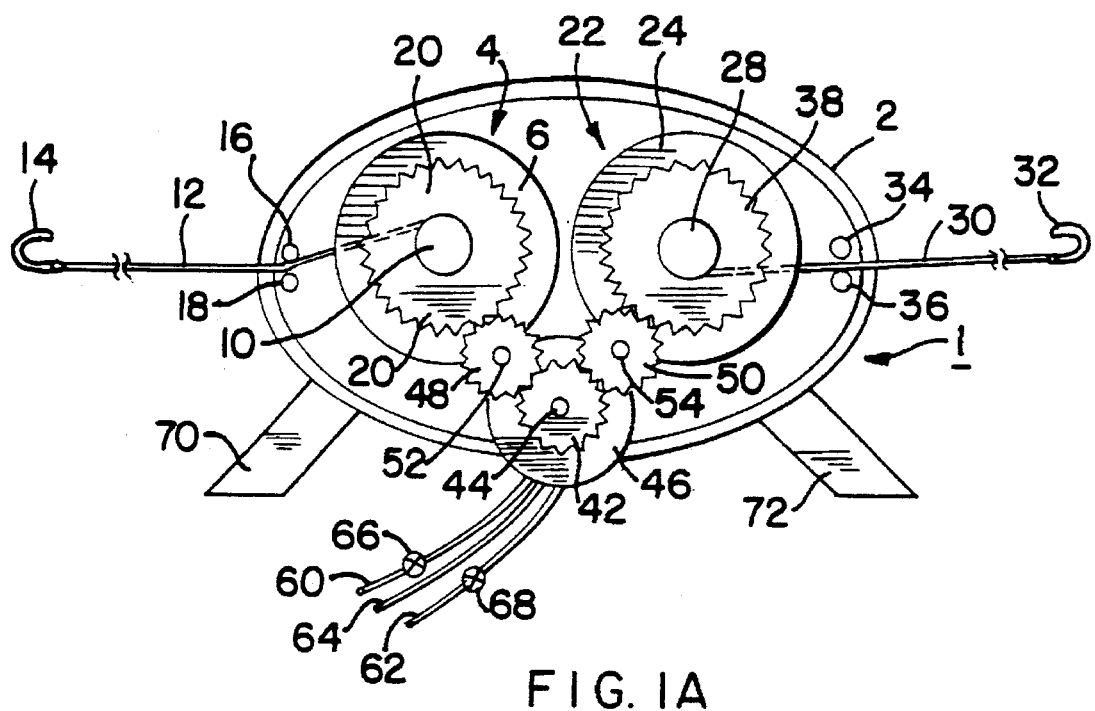
FIG. IA
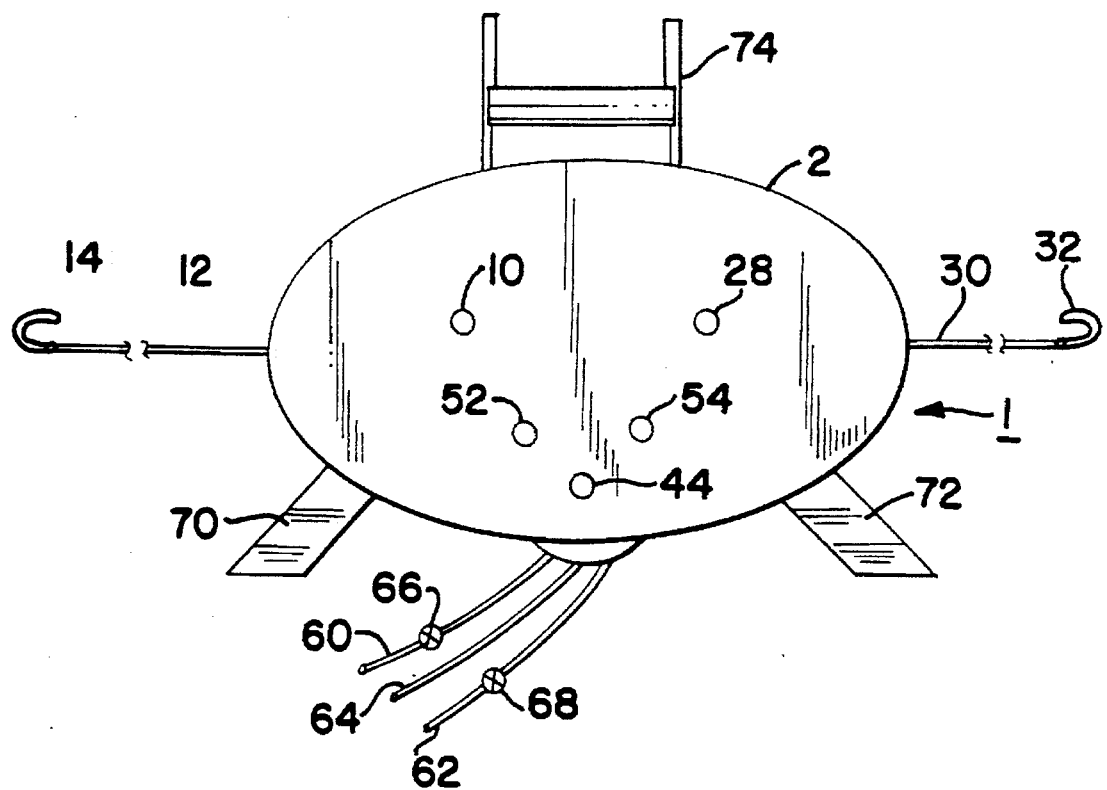
FIG. IB

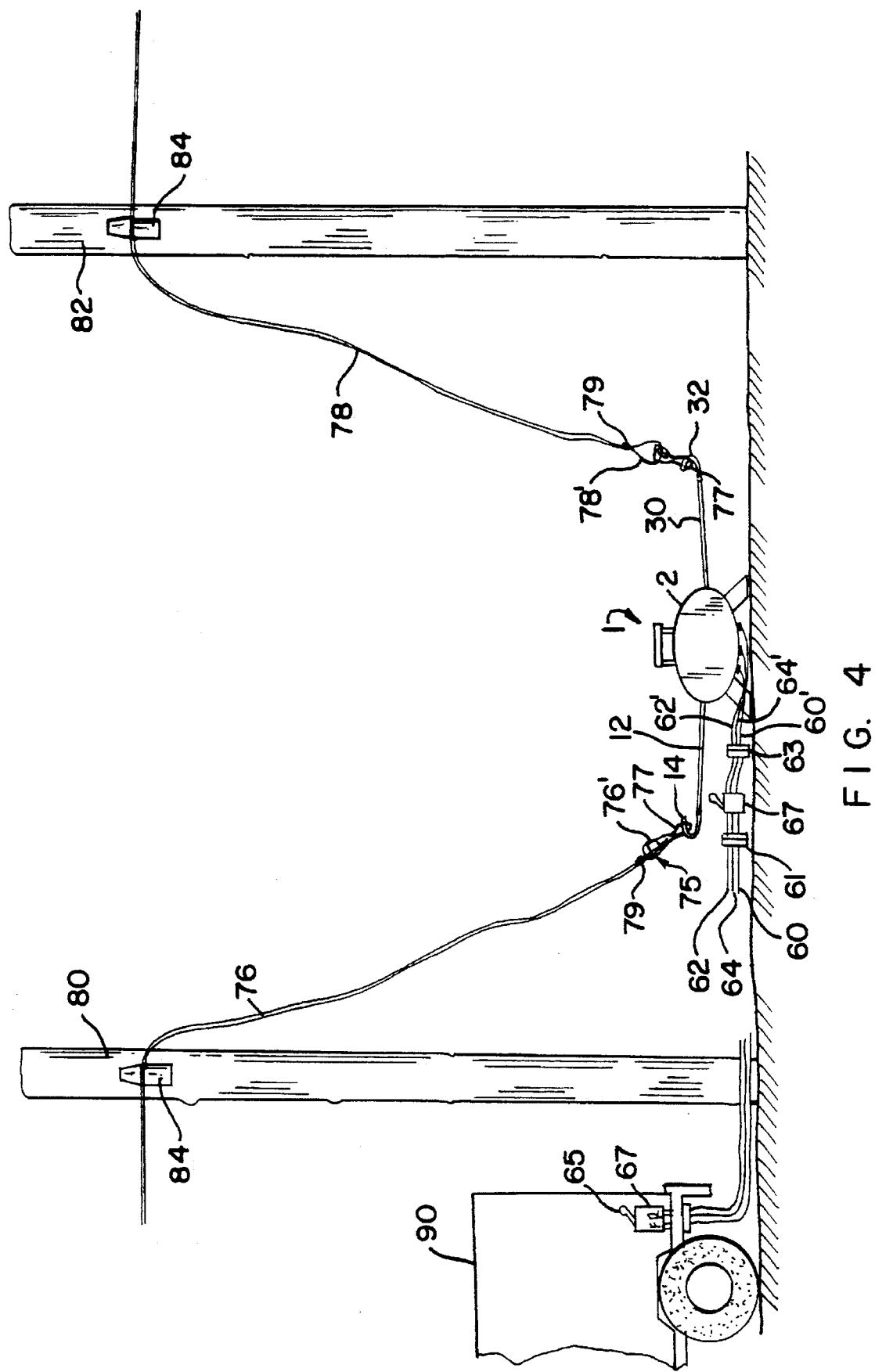

5,661,903

METHOD FOR SPLICING SUSPENDED WIRES

This is a division of application Ser. No. 08/230,293, filed Apr. 20, 1994, now U.S. Pat. No. 5,507,471.

FIELD OF INVENTION

The present invention relates generally to apparatus for repairing broken power lines, telephone wires, and other wires or cables strung between poles or otherwise elevated, and more particularly relates to apparatus for facilitating the splicing of the ends of a broken wire that extends between two poles by providing for elevating the broken ends as closely together at their normal height as possible to permit the splice to be made.

BACKGROUND OF THE INVENTION

Linemen for power and telephone companies often find it necessary to repair wires strung between poles that have been broken by storms, ice formation, fallen trees, etc. Currently, the procedure for accomplishing this task is as follows.

1. If the section of wire that was originally connected between adjacent poles is in good condition except for the break, the ends of the section are cut at the tops of the poles and the wires to which the ends were connected are tied off at the top of the poles for securing the sections of wire still connected to the other sides of the poles.

2. The broken ends are spliced together on the ground, or a new section of wire of proper length is laid out if the broken section cannot be repaired.

3. An operator in a bucket pulls up one end of the spliced wire or new wire with a rope and connects or splices it to the end of the tied off wire on a first pole of the poles between the broken wire.

4. An operator in a bucket pulls the other end of the spliced wire up to the second of the two poles with a rope.

5. One end of a LUGALL® device is attached to the end of the tied off wire at the top of the second pole.

6. The other end of the LUGALL® is attached to the other end of the spliced wire that has just been pulled up from the ground to a desired height on the second pole.

7. The ends of the wires are drawn together with the LUGALL® and spliced, and the LUGALL® is then removed.

This procedure requires operations at the top of each pole and at least three splices if the broken wire is reused, so as to require considerable time. In order to reduce the time that service is out, two men and two service trucks are often used.

BRIEF SUMMARY OF THE INVENTION

By using a wire tensioning device of this invention a broken overhead line, cable, or wire can be repaired by one man and one service truck in less time than it can be repaired by two men and two trucks. In its preferred form, the device is comprised of two drums having belts of electrical insulating material wound on them, a motor for rotating the drums in either direction and means for selectively decoupling the motor from either drum, to permit either drum to freely rotate and be hand rotatable. In use, the free ends of the belts are respectively attached near the broken ends of the wires from the poles. In doing this, it may be advantageous to decouple one or both drums from the motor so that the belts can be manually pulled from the drums as required. Then the motor is coupled to both drums and operated so as to wind up the belts. As the winding proceeds, the entire device rises from the ground as the broken wire ends are drawn towards one another. When the device reaches the original height of the broken wire section, the broken ends are spliced together and the belts are detached from the wires. Controls for the motor can be located near the device and/or at a service truck. Although the motor could be electrical, it is preferable for safety reasons that it be hydraulic.

This operation can be performed while the wires are electrically energized or "hot" so that no tying off is required.

BRIEF DESCRIPTION OF THE DRAWINGS

Various embodiments of the present invention are described below with reference to the drawings, in which like items are identified by the same reference designation, and in which:

FIG. 1A is a front elevational view of a wire tensioning device incorporating the invention with the front half of its housing removed;

FIG. 1B is a front elevational view of the housing;

FIG. 4 illustrates the initial coupling of the wire tensioning device to broken ends of a wire section.

DETAILED DESCRIPTION OF THE INVENTION

Figure 2:
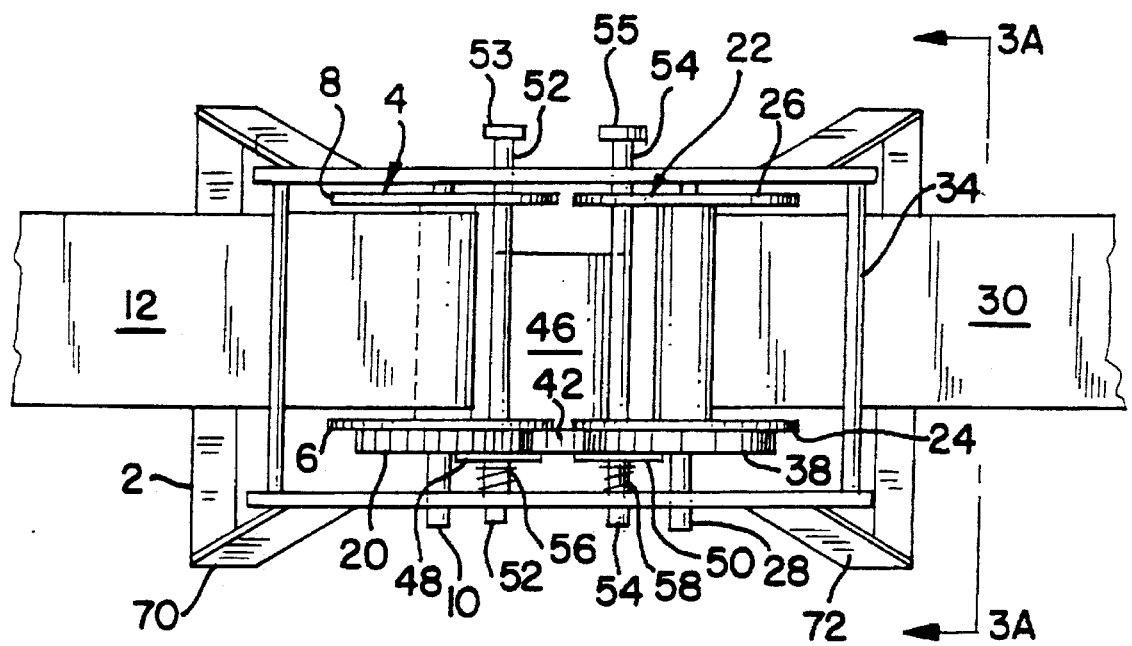
FIG. 2 is a top view showing the operative parts of a wire tensioning device incorporating this invention.

Reference is now collectively made to FIGS. 1A, 1B, 2 and 3A and 3B for a description of an embodiment of the invention.

In FIG. 1A the front half of a housing 2 has been removed in order to reveal the operating components of the wire tensioning device 1 of the invention. The view is taken looking at ends of the various axles 10, 28, 52, 44, and 54. The ends of all axles are mounted for free rotation in the housing 2, e.g. by bearings not shown.

A drum 4 is formed by spaced flanges 6 and 8 (see FIG. 2) secured to an axle 10. One end of a belt 12 that is preferably formed of nylon webbing is secured to the axle 10 so that it can be wound onto the axle 10 when it is turned, and a hook 14 is attached to the other end. The belt 12 passes between two guide rollers 16 and 18 at one end of the housing 2. A driven gear 20 is secured on and near the front end of the axle 10.

An identical structure is formed by a drum 22 having spaced flanges 24 and 26 secured to an axle 28, a belt 30, a hook 32, guide rollers 34 and 36 and a driven gear 38 mounted on the axle 28.

Figure 3A:
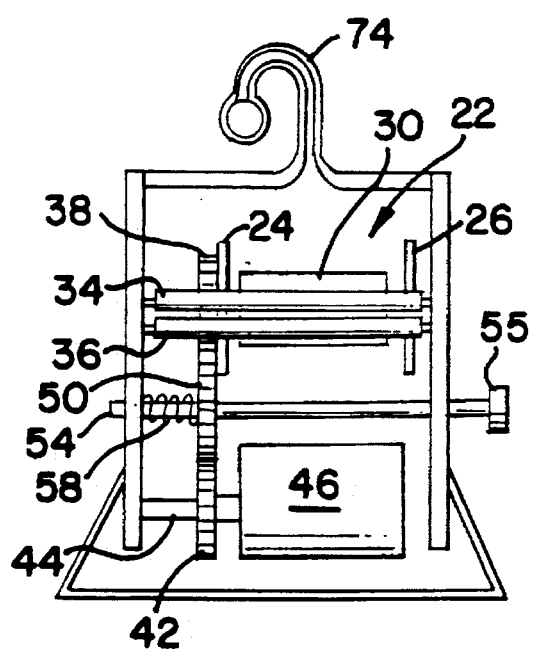
FIG. 3A is an end view of a wire tensioning device of this invention, the opposite end view being a mirror image thereof.
Figure 3B:
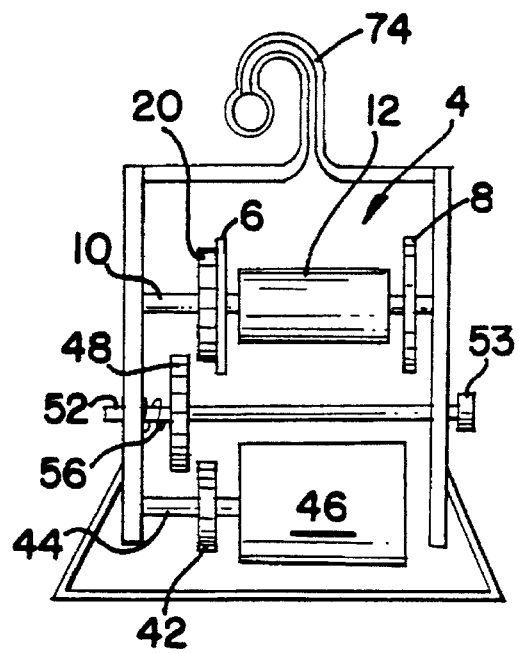
FIG. 3B is the end view of FIG. 3A with drum 22, axle 54, gear 50, and guide rollers 34 and 36 removed.

A drive gear 42 is secured to a shaft 44 of a motor 46 and is adapted for engagement with two idler gears 48 and 50 that are respectively secured to axles 52 and 54. The idler gears 48 and 50 are adapted for engagement with the gear 20 for the drum 4 and the gear 38 for the drum 22, respectively. As illustrated in FIGS. 3A and 3B, the axles 52 and 54 can be individually moved along their length via depression of buttons 53 and 55, respectively, so as to place the idler gears 48 and 50 secured to them, respectively, in or out of engagement with the drive gear 42 and the associated driven gears 20 and 38, respectively. In FIG. 2, the idler gear 48 is shown as being biased by a spring 56 into engagement with the drive gear 42 and the gear 20 so that the drum 4 can be rotated by the motor 46, and the idler gear 50 is shown as being biased by a spring 58 into engagement with the drive gear 42 and the gear 38 so that the drum 22 can be rotated by the motor 46. The springs 56 and 58 are coil springs encompassing the axles 52 and 54 and are located between the housing 2 and the idler gears 48 and 50, respectively.

Figure 5:
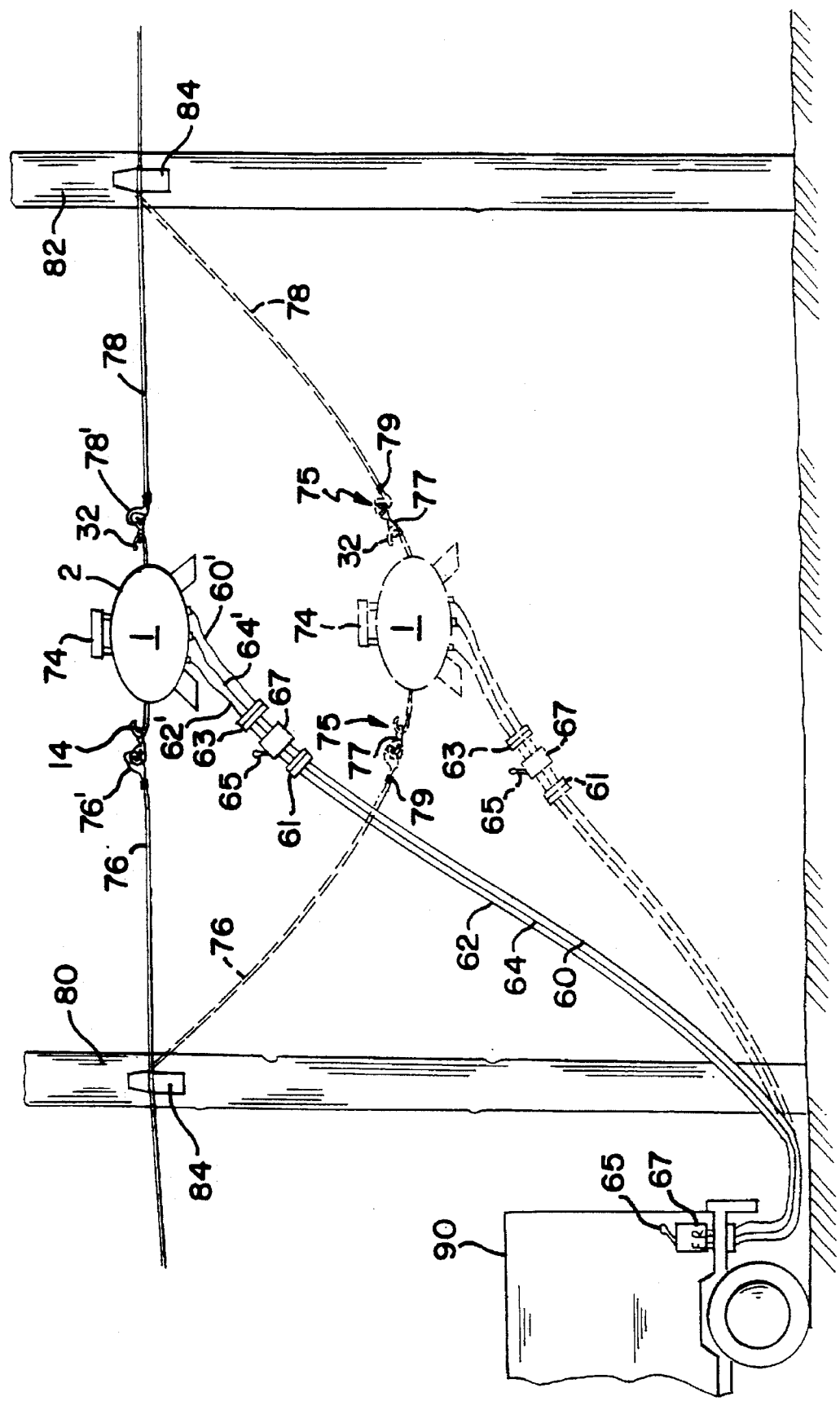
FIG. 5 illustrates intermediate and final operating positions of the wire tensioning device of this invention when a break in a wire is being repaired.

If, as preferred, the motor 46 is hydraulic, three hoses 60, 62 and 64 are coupled to it as shown in FIG. 1A. A valve 66 is in series with the hose 60, and a valve 68 is in series with the hose 62. One valve selectively controls fluid flow to the motor 46 in such manner as to cause it to turn in one direction, and the other valve selectively controls fluid flow to the motor that causes it to turn in the opposite direction. The other ends of the hoses 60, 62, and 64 are connected to a hydraulic pump (not shown) on a service truck 90 as shown in FIGS. 4 and 5. Valves such as 66 and 68 could be located at the truck or alternatively at both locations, in a control box 67 with a control handle 65 for selectively operating valves 66 or 68.

As shown in FIGS. 4 and 5, a control box 67 containing valves 66 and 68 is connected at one end via detachable hydraulic line coupling 61 to hoses 60, 62, and 64, and at its other end via detachable hydraulic line coupling 63 to hoses 60', 62', and 64' from the present tensioning device 1. A manually operable control handle 65 is provided on control box 67 for permitting selective activation of valves 66 or 68 to wind or unwind belts 12 and 30 from respective drums 4 and 22.

In the preferred embodiment, the belts 12 and 30 are each at least twenty feet in length based upon the repair of forty-five foot high electrical power lines.

FIG. 3A shows an end view of the present tensioning device 1. In the interest of clarity FIG. 3B only shows the drum 4 and the means for driving it. The idler gear 48 is shown as being out of engagement with the drive gear 42 and the gear 20 for the drum 4.

Turning now to the front of the housing 2 shown in FIG. 1B, feet 70 and 72 of any suitable construction are joined to the bottom of the housing 2, and a handle 74 is joined to the top. Reference is made to FIGS. 4 and 5 for a description of the manner in which the wire tensioning device 1 of this invention is used. The broken wire has a section 76 (hung from pole 80 via an insulator 84) on one side of the break and a section 78 (hung from a pole 82 via an insulator 84) on the other, at least one of which may have a high voltage on it. It is obvious that the sections 76 and 78 cannot be brought into contact while on the ground. The wire tensioning device 1 is placed on the ground between the ends of the sections 76 and 78 that may be in the air, and the belts 12 and 30 are pulled out of the housing 2 until the loose end of the wire section 76 can be held or gripped by a wire grip tool 75 having an eyelet 77 connected to the hook 14, and the loose end of the wire section 76' can be wrapped back and taped to itself via tape 79, as shown. In order to do this, both axles 52 and 54 must be pushed via pushbuttons 53 and 55, respectively, so as to disengage their idler gears 48 and 50 and permit both drums 4 and 22 to turn freely. If desired, only pushbutton 53 can be depressed for freeing drum 4 to connect to wire section 76, as described. This can be followed by then pushing pushbutton 55 for freeing drum 22. Similarly, to connect the loose end 78' of wire section 78 to tensioning device 1, with belt 30 pulled out of housing 2 (as previously described), loose end 78' is held or gripped by a wire grip tool 75 having an eyelet 77 connected to hook 32. The loose end 78' of wire 78 is wrapped back and taped to itself via tape 79. Note that the wire grip tool 75 can be provided, for example, by Haven or Chicago® Grips, manufactured by Klein Tools Inc., Chicago, Ill. Alternatively, control handle 65 of a control box 67 on truck 90 or proximate tensioning device 1 can be moved to operate the appropriate one of valves 66 and 68 operating hydraulic motor 46 to rotate counterclockwise, in this example, to feed out belts 12 and 30. If the break is near one pole, the operator may have to use a lift bucket to accomplish this task. At this point, the valves 66 or 68 are controlled via control handle 65 so as to cause the belts 12 and 30 to be wound up on the drums 4 and, 22 respectively. As can be seen from FIG. 1A, the belts must be wound around their drums in opposite directions because the drums 4 and 22 will turn in the same direction, in this example. As the belts 12 and 30 are drawn into the housing 2, the present wire tensioning device 1 will be lifted from the ground as shown by the dashed lines in FIG. 5. Finally, it will reach the solid line position where the sections 76 and 78 are positioned as before the break occurred. During this procedure no current flows between the sections 76 and 78 because the belts 14 and 30 are non-conductive.

The ends of wire sections 76' and 78' are untaped and spliced together using conventional techniques. The wire can then be disengaged from the wire grip tools 75, and the wire tensioning device 1 removed by operating handle 65 of controller 67 to rotate motor 46 in a counter clockwise, in this example, direction to release tension off of belts 12 and 30, and transfer the tension to the spliced section.

Note that handle 74 is typically used for carrying device 1. However, handle 74 may also be used for hanging device 1 from a cable or tree limb at a midpoint between broken wire or cable ends under repair.

Although various embodiments of the invention are described herein for purposes of illustration, they are not meant to be limiting. Those of skill in the art may recognize modifications that can be made in the illustrated embodiments. Such modifications are meant to be covered by the spirit and scope of the appended claims. For example, the belts 12 and 30 can be replaced by rope, cable, chains, straps, and so forth. Also, the motor 46 can be provided by a battery driven motor, for example, with a remote radio frequency controller, thereby eliminating hydraulic hoses or electric power lines.

What is claimed is:

1. A method for splicing broken ends of a wire having other ends, respectively, suspended from a given height above ground for retaining the wire out of reach, comprising the steps of:

attaching free ends of first and second belts, respectively, from opposite ends of a device to points on said wire near its respective broken ends;

operating said device in one direction, thereby placing said first and second belts under tension, drawing said broken ends together and raising said device and said broken ends of said wire near to said given height;

splicing said broken ends of said wire;

operating said device in a reverse direction to release the tension on said first and second belts; and detaching said first and second belts from said wire.

2. A method for splicing broken ends of a wire as set forth in claim 1, wherein said device includes first and second drums, and motor driven means for selectively rotating each one of said first and second drums, said first and second belts having opposite ends from their free ends, respectively, attached to said first and second drums, respectively, wherein said steps of operating said device include the steps of:

rotating each of said first and second drums each in one direction, respectively, for winding said first and second belts onto said first and second drums, respectively, for operating said device in its said one direction; and rotating said first and second drums each in a reverse direction to said one direction, respectively, for operating said device in its said reverse direction to unwind said first and second belts from a first and second drums, respectively.

3. A method of splicing the broken ends of a wire as set forth in claim 2, wherein said attaching step includes the step of operating said device in said reverse direction for withdrawing sufficient lengths of said first and second belts, respectively, as required for attaching their respective free ends to points near the broken ends of said wire.

4. A method for splicing the broken ends of a wire as set forth in claim 2, wherein said device further includes means for selectively releasing either one or both of said first and second drums, respectively, to freely rotate, and wherein said attaching step includes the steps of:

releasing said first and second drums to rotate freely, for withdrawing sufficient lengths of said first and second belts, respectively, as required for attaching their respective free ends to points near the broken ends of said wire.

5. A method for splicing the broken ends of a wire as set forth in claim 1, wherein said device includes means for operating said device remotely, and said method includes the step of using said remote control means to operate said device at a remote point therefrom.

6. A method for splicing the broken ends of a wire as set forth in claim 5, wherein said wire is an electrical power line initially suspended above ground between two poles and wherein said step of remotely operating said device is conducted on the ground.

7. A method for elevating the broken ends of a suspended over head wire for permitting a single repairman to elevate the ends of the broken wire to their original height and tension, out of reach for a person on the ground, comprising the steps of:

attaching the broken ends of said wire to opposite ends of a device, respectively;

operating said device in one direction for drawing said broken ends towards and close to one another, while raising said device and said broken ends of said wire near to said original height, and restoring the original tension on said wire;

splicing said broken ends of said wire, thereby creating a spliced wire; and operating said device in a reverse direction to release the device from said spliced wire.

8. A method for splicing the broken ends of a wire as set forth in claim 22 wherein said device includes means for operating said device remotely, and said method includes the step of using said remote control means to operate said device at a remote point therefrom.

9. A method for splicing the broken ends of a wire as set forth in claim 22, wherein said wire is an electrical power line initially suspended overhead between two poles and wherein said step of remotely operating said device is conducted on the ground.

* * * * *